(12) United States Patent
Saito et al.

(10) Patent No.: US 6,900,842 B2
(45) Date of Patent: May 31, 2005

(54) ELECTRONIC STILL CAMERA

(75) Inventors: Masashi Saito, Hachioji (JP);
Yasutoshi Fujii, Hachioji (JP)

(73) Assignee: Konica Corporation (JP)

( * ) Notice: Subject to any disclaimer, the term of this patent is extended or adjusted under 35 U.S.C. 154(b) by 828 days.

(21) Appl. No.: 09/813,527

(22) Filed: Mar. 21, 2001

(65) Prior Publication Data

US 2001/0026324 A1 Oct. 4, 2001

(30) Foreign Application Priority Data

Mar. 23, 2000 (JP) ........................................ 2000-082573

(51) Int. Cl.[7] .............................................. H04N 5/232
(52) U.S. Cl. ...................................... 348/348; 348/350
(58) Field of Search ................................ 348/345, 348, 348/349, 350, 351, 370

(56) References Cited

U.S. PATENT DOCUMENTS 4,963,985 A * 10/1990 Isoguchi et al. ............ 348/348
5,436,656 A * 7/1995 Soga et al. ............... 348/220.1
5,978,027 A * 11/1999 Takeda ...................... 348/348

* cited by examiner

*Primary Examiner*—Tuan Ho
(74) *Attorney, Agent, or Firm*—Cantor Colburn LLP

(57) ABSTRACT

An electronic still camera, comprises a lens to form an image of a subject; a distant measuring section to measure a distance to a subject and to output a distance signal; an image capturing focusing section having a driving section to shift the lens within a scanning range determined based on the distance signal, an image capturing element to output an image signal of the image of the subject and a detecting section to detect a focusing point of the lens based on the image signal; and a light measuring section to measure a luminance of the subject and to output a luminance signal. The image capturing focusing section changes the scanning range of the lens in accordance with the luminance signal measured by the light measuring section.

3 Claims, 3 Drawing Sheets

ELECTRONIC STILL CAMERA

BACKGROUND OF THE INVENTION

This invention relates to a device provided with an image capturing element, and it relates, for example, to an electronic still camera which can exactly measure the distance of a subject.

With an improvement of the electronic technologies, there have been developed electronic still cameras, wherein images picked up are transformed into digital data to be stored, and they are already on the market. A user can display the image picked up in electronic still camera on his personal computer and can make prints by his printer, thus, the electronic still camera has become to have a wide range of application.

However, being provided with a range finding device employing infrared rays or ultrasonic waves, an ordinary silver halide type camera is able to measure the distance to a subject by the range finding device, and to move a image capturing lens to the focus position based on the distance.

Contrarily to this, in a common electronic still camera, separately from or additionally to this range finding device, there is provided a device which is able to obtain a focus position of the image capturing lens by an image capturing element (hereafter referred to as an image capturing focusing device).

While driving the image capturing lens for focusing, the image capturing focusing device is to search the best focus position from the resulted image signal. In this specification, let it be assumed that driving the image capturing lens is called "scanning". As for the merit of the image capturing focusing device, there are given that the focusing is performed by the function employed originally in the electronic still camera, without using the range finding device such as one employed in the silver halide type camera, and that the focusing is performed more accurately by picking up the image practically, comparing to the above-mentioned range finding device which may have a case that the radiated infrared rays are not reflected effectively.

However, when the image capturing focusing device is used, the fact that the luminance of the subject is low is one reason for the low focusing accuracy. The smaller amount of light of the subject received by the image capturing element CCD makes a difference between the noise component existing in each pixel of a CCD and the image signal obtained by the photoelectric conversion to be less. It is difficult to find the focus position based on the image signal that is not clearly different from the noise component.

As described above, the image capturing focusing device practically picks up the image of the subject, while driving the image capturing lens for focusing, and searches the best focus point as a focus position based on the resulted image signal. Therefore, the searching of the position takes much time. Accordingly, there is conducted a method to obtain the focus position quickly by finding a subject distance with the range finding device of the silver halide type camera, and by moving the image capturing lens in the prescribed range whose center is corresponding to the subject distance.

However, it is not always desirable to focus the main subject at which a photographer aims. For example, in the case of the stroboscopic photographing, when the subject is beyond the range covered by the electronic flash light (for example 5 m), an amount of the reflected light of this subject is low, and its image becomes unclear, even if the photographer focused it. If another subjects existing at the different distance are out of focus, the picture will probably become blurred as a whole. A problem is how to photograph in such a case.

For the problem that the image capturing focusing device takes much time for detection of the focus position, if the image monitoring area smaller than the image plane for photographing is set at the center of the image plane for photographing where the main subject is estimated to exist, and if the focus position is obtained based on the image signal from CCD corresponding to this image monitoring area, the processing time of the image signal can be shortened to some degree. However, setting the image monitoring area has a risk to find the focus position erroneously, because of a failure to catch the subject image. For example, when the near subject is aimed through the optical finder of the electronic still camera, the subject scope imaged on the light receiving plane of the image capturing element can be greatly different from the subject scope observed through the optical finder because of the influence of the parallax, though there is not big difference for the distant subject. In this case, there is a fear that the lens may be driven for focusing for the subject which is different from one aimed through the optical finder.

It is possible to photograph a subject through enlargement or reduction when the zoom lens is provided on the electronic still camera, but if the image monitoring area is set to be constant regardless of image magnification, when a subject is too small for the image monitoring area, the background for the subject may be focused, meanwhile, when the subject is too large for the image monitoring area, only the person's clothes of uniform graduation may be in the image monitoring area, and it is sometimes impossible to obtain the clear evaluation value for judging whether the subject is in focus or not.

Whereas, in an active range finding device, using the infrared rays or ultrasonic waves (hereafter referred to as infrared rays or others), the subject distance is measured by radiating the infrared rays or others, and by receiving the infrared rays or others reflected from the subject. When the subject is distant, the reflected infrared rays or others decrease, and when the infrared rays or others exist in abundance in the environment, the difference from the infrared rays or others reflected from a subject becomes unclear, so the measured distance is feared to be inaccurate.

Accordingly, if the scanning range of the image capturing lens is decided by the incorrectly measured distance, the resulted focus position may be inappropriate.

Additionally, when the exposure is excessive because of the characteristics of CCD, photoelectric converting pixels are saturated and the saturated pixels output nothing but fixed pixel signals, which makes it difficult to form the image based on these pixel signals. Accordingly, overexposure needs to be prevented in an electronic still camera. Though it is comparatively easy to prevent the overexposure for photographing under the natural light, it is difficult, in photographing employing electronic flash light, to estimate the graduation of the subject before photographing, so the problem is how to prevent the overexposure.

SUMMARY OF THE INVENTION

In consideration of the problems in the above-mentioned conventional technology, it is an object of this invention to provide the electronic still camera which can measure the subject distances precisely and prevent the overexposure.

To accomplish the above-mentioned objects, an electronic still camera of the first embodiment, is provided with the range finding means that measures the distance to the subject, the image capturing focusing means which can detect the focus position of the image capturing lens, by scanning the image capturing lens in the limits fixed by the measuring results of the range finding means, based on the output signal of the image capturing element where the image of subject is formed through the image capturing lens, and with the photometric means to measure the luminance of the subject, and it changes the scanning range for the image capturing lens in accordance with the luminance of the subject measured by the photometric means.

An electronic still camera of the second embodiment is provided with the range finding means that measures the distance to the subject, the image capturing focusing means which can detect the focus position of the image capturing lens, by scanning the image capturing lens in the limits fixed by the measuring results of the range finding means, based on the output signal of the image capturing element where the image of subject is formed through the image capturing lens, the photometric means to measure the luminance of the subject, and with the electronic flash means wherein a radiation mode to radiate electronic flash light is selectable according to the shutter release, and it narrows the scanning range of the image capturing lens within the effective covering range of the electronic flash light, when the electronic flash radiation mode is selected by the electronic flash means in the case where the luminance of the subject measured by the photometric means is not more than the prescribed value.

An electronic still camera of the third embodiment is provided with the range finding means that measures the distance to the subject, and the image capturing focusing means which can detect the focus position of the image capturing lens, by scanning the image capturing lens in the limits fixed by the measuring results of the range finding means, based on the output signal of the image capturing element where the image of subject is formed through the image capturing lens, and the image capturing focusing means is to detect the focus position of the image capturing lens by processing the output signal of the image capturing element corresponding to the image monitoring area (focus condition monitoring area or distance measuring area) which is smaller than the image plane for photographing (image capturing area of CCD), and at least one of the position or the area of the image monitoring area corresponding to the image plane for photographing is changed, based on the results of measurement by the range finding means.

An electronic still camera of the forth embodiment is provided with the range finding means that measures the distance to the subject, and the image capturing focusing means which can detect the focus position of the image capturing lens, by scanning the image capturing lens in the limits fixed by the measuring results of the range finding means, based on the output signal of the image capturing element where the image of subject is formed through the image capturing lens, and the image capturing focusing means is to detect the focus position of the image capturing lens by processing the output signal of the image capturing element corresponding to the image monitoring area which is smaller than the image plane for photographing, and the image capturing lens is a zoom lens, and the area of the image monitoring area to the image plane for photographing is changed based on the zooming position of the zoom lens and the subject distance measured by the range finding means.

An electronic still camera of the fifth embodiment is provided with the range finding means that measures the distance to the subject by radiating a detection wave and receiving the detection wave reflected from the subject, and the image capturing focusing means which can detect the focus position of the image capturing lens, by scanning the image capturing lens in the limits fixed by the measuring results of the range finding means, based on the output signal of the image capturing element where the image of subject is formed through the image capturing lens, and the image capturing focusing means is to detect the focus position of the image capturing lens by processing the output signal of the image capturing element corresponding to the image monitoring area which is smaller than the image plane for photographing, and since the image capturing lens is a zoom lens, the scanning range of the image capturing lens of the sensor type focusing device is changed based on the zooming position of the zoom lens and the subject distance measured by the range finding means.

An electronic still camera of the sixth embodiment is provided with the range finding means that measures the distance to the subject, and the image capturing focusing means which can detect the focus position of the image capturing lens, by scanning the image capturing lens in the limits fixed by the measuring results of the range finding means, based on the output signal of the image capturing element where the image of subject is formed through the image capturing lens, and the image capturing focusing means obtains the evaluation value corresponding to the sharpness of the subject image received by the image capturing element based on the output signal of the image capturing element, and the scanning range of the image capturing lens is narrowed, when the value is not more than the prescribed value.

An electronic still camera of the seventh embodiment is provided with the range finding means that measures the distance to the subject by receiving the detection wave, and the image capturing focusing means which can detect the focus position of the image capturing lens, by scanning the image capturing lens in the limits fixed by the measuring results of the range finding means, based on the output signal of the image capturing element where the image of subject is formed through the image capturing lens, and the scanning range of the image capturing lens is expanded, when the amount of the detecting wave is not more than the prescribed value.

An electronic still camera of the eighth embodiment is provided with the range finding means that measures the distance to the subject, the image capturing focusing means which can detect the focus position of the image capturing lens, by scanning the image capturing lens in the limits fixed by the measuring results of the range finding means, based on the output signal of the image capturing element where the image of subject is formed through the image capturing lens, the photometric means to measure the luminance of the subject, and with the electronic flash means which radiates the electronic flash light when the shutter is released, and the electronic flash means fixes the amount of the radiation light, in accordance with the subject distance based on the result of the measurement by the range finding means, or the subject distance based on the focus position detected by the image capturing focusing means, whichever is shorter.

An electronic still camera of the first embodiment, is provided with the range finding means that measures the distance to the subject, the image capturing focusing means which can detect the focus position of the image capturing lens, by scanning the image capturing lens in the limits fixed by the measuring results of the range finding means, based on the output signal of the image capturing element where the image of subject is formed through the image capturing lens, and with the photometric means to measure the luminance of the subject, and it changes the scanning range of the image capturing lens in accordance with the luminance of the subject measured by the photometric means. That is, in the case of the low luminance of the field, it is conceivable that the detecting accuracy of the image capturing focusing means is low, therefore, the focusing accuracy can be secured by controlling the large deviation from the focus position based on the distance measured by the range finding device, even if the focus position detected by the image capturing focusing means is erroneous, because, for example, the scanning range of the image capturing lens is narrowed.

On the other hand, in the case of the high luminance of the field, there is no need to narrow the scanning range of the image capturing lens, because it is conceivable that the detecting accuracy of the image capturing focusing means is high. Both of the active and passive devices will do for the range finding device.

Additionally, when the luminance of the subject measured by the photometric means is not more than the prescribed value, if the focus position of the image capturing lens is fixed based on the results of the measurement by the range finding means without operating the image capturing focusing means, it is possible to be free from the detection by the image capturing focusing means whose accuracy is considered low in determination of the focus position, and thereby to focus properly and to conduct quick focusing operations.

An electronic still camera of the second embodiment is provided with the range finding means that measures the distance to the subject, the image capturing focusing means which can detect the focus position of the image capturing lens, by scanning the image capturing lens in the limits fixed by the measuring results of the range finding means, based on the output signal of the image capturing element where the image of subject is formed through the image capturing lens, the photometric means to measure the luminance of the subject, and with the electronic flash means wherein a radiation mode to radiate electronic flash light is selectable according to the shutter release, and it narrows the scanning range of the image capturing lens within the effective covering range of the electronic flash light, when the electronic flash radiation mode is selected by the electronic flash means in the case where the luminance of the subject measured by the photometric means is not more than the prescribed value.

That is, when the main subject exists beyond the range covered by the electronic flash light, an image that is totally less blurred is obtained by focusing more actually on the subject within a range effectively covered by electronic flash light by avoiding focusing on the main subject. Here, the range effectively covered by the electronic flash light means the distance where the sufficient light for the proper exposure is reflected, when the electronic flash light of the prescribed guide number is radiated.

An electronic still camera of the third embodiment is provided with the range finding means that measures the distance to the subject and the image capturing focusing means which can detect the focus position of the image capturing lens, by scanning the image capturing lens in the limits fixed by the measuring results of the range finding means, based on the output signal of the image capturing element where the image of subject is formed through the image capturing lens, and the image capturing focusing means is to detect the focus position of the image capturing lens by processing the output signal of the image capturing element corresponding to the image monitoring area which is smaller than the image plane for photographing, and at least one of the position and the area of the image monitoring area corresponding to the image plane for photographing is changed, based on the results of measurement by the range finding means. In the case of the camera provided with an optical finder, when a photographer photographs while viewing through the optical finder, the difference between the position of the image capturing lens and that of the optical finder causes the parallax originally. An amount of this parallax varies depending upon the subject distance. In that case, if the amount of the parallax is obtained based on the result of the distance measurement by the range finding means, and if the image monitoring area is displaced (or changed in terms of area) against the image plane for photographing so that the subject being positioned at the center of the visual field frame of the optical finder may be covered by the image monitoring area, the main subject desired to be photographed can be focused, independently of the subject distance.

It is therefore preferable that the electronic still camera is provided with the optical finder, and the position of the image monitoring area to the image plane for photographing is to be changed according to the parallax of the optical finder in the subject distance measured by the range finding means.

Furthermore, in the case that the image capturing lens is a zoom lens, it is more preferable that the position of the image monitoring area to the image plane for photographing is changed based on the focal length of the zoom lens, because the focal length of the zoom lens has an influence on the parallax.

Furthermore, a photographer does not always view through an optical finder, even if the electronic still camera is provided with the optical finder. The reason for the foregoing is that most of the electronic still cameras can directly display a subject image on the image monitor such as a liquid crystal screen, based on the image signal from the image capturing element, independently of the operation of the release button, and the photographer can photograph while watching the displayed image. Therefore if a detecting means which can detect that a photographer is viewing through the optical finder is provided on the electronic still camera, so that the position of the image monitoring area to the image plane for photographing can be changed when the detecting means detects that the photographer is viewing through the optical finder, an inappropriate focusing caused by the parallax can be prevented.

On the contrary, in the case that the electronic still camera is provided with an image display device which displays a subject image based on the output signal from the image capturing element, when the image display device is displaying an image of a subject, a photographer is supposed to be photographing while watching the displayed image. Accordingly, if the position of the image monitoring area is not changed independently of the result of measurement by the range finding means, it is considered to be possible to focus on the subject which is wanted by the photographer.

An electronic still camera of the forth embodiment is provided with the range finding means that measures the distance to the subject, and the image capturing focusing means which can detect the focus position of the image capturing lens, by scanning the image capturing lens in the limits fixed by the measuring results of the range finding means, based on the output signal of the image capturing element where the image of subject is formed through the image capturing lens, and the image capturing focusing means is to detect the focus position of the image capturing lens by processing the output signal of the image capturing element corresponding to the image monitoring area which is smaller than the image plane for photographing, and the image capturing lens is a zoom lens, and the area of the image monitoring area to the image plane for photographing is changed based on the zooming position of the zoom lens and the subject distance measured by the range finding means.

In the case that a image capturing lens of the electronic still camera is a zoom lens, its focal length varies depending on the zoom position. Under the assumption that the image monitoring area is invariable irrespective of the image magnification, when the subject is too small for the image monitoring area, there is a fear that a background is focused. Accordingly, in this invention, an area of the image monitoring area for the image plane for photographing is changed based on the zoom position of the zoom lens and on the distance to the subject measured by the range finding means, and thereby, the appropriate image monitoring area can be set for the size of a subject for the image plane for photographing, thus the focusing can be performed more appropriately.

An electronic still camera of the fifth embodiment is provided with the range finding means that measures the distance to the subject by radiating a detection wave and receiving the detection wave reflected from the subject, and the image capturing focusing means which can detect the focus position of the image capturing lens, by scanning the image capturing lens in the limits fixed by the measuring results of the range finding means, based on the output signal of the image capturing element where the image of subject is formed through the image capturing lens, and the image capturing focusing means is to detect the focus position of the image capturing lens by processing the output signal of the image capturing element corresponding to the image monitoring area which is smaller than the image plane for photographing, and since the image capturing lens is a zoom lens, the scanning range of the image capturing lens of the sensor type focusing device is changed based on the zooming position of the zoom lens and the subject distance measured by the range finding means. That is, when the main subject is distant (for example, greater than 10 m), it sometimes happens that the distance is not measured properly, because the detection wave of infrared rays or others radiated from the range finding means may not reflect effectively on the main subject. When the image magnification based on the resulted zoom position and the distance to the subject is judged small, it is possible to obtain the focus position properly by driving the image capturing focusing means only, without relying on the results of the measurement by the range finding means.

An electronic still camera of the sixth embodiment is provided with the range finding means that measures the distance to the subject, and the image capturing focusing means which can detect the focus position of the image capturing lens, by scanning the image capturing lens in the limits fixed by the measuring results of the range finding means, based on the output signal of the image capturing element where the image of subject is formed through the image capturing lens, and the image capturing focusing means obtains the evaluation value corresponding to the sharpness of the subject image received by the image capturing element based on the output signal of the image capturing element, and the scanning range of the image capturing lens is narrowed, when the value is not more than the prescribed value. For example, when a single-colored wall is photographed, image signals coming from the image capturing element are uniform, and the image capturing focusing means can not perform the focusing action properly based on the image signals from the image capturing element. Therefore, the evaluation value corresponding to the sharpness of the image of the subject received by the image capturing element is obtained, and using it, this evaluation value is used for judging whether the focusing accuracy of the image capturing focusing means is reliable or not. To be more concrete, in case that the evaluation value is not more than the prescribed value, the reliability of the focus position detected by the image capturing element is judged to be low, and it is possible to suppress that the focus position detected by the image capturing focusing means is away greatly from the focus position based on the distance measured by the range finding device, even if the focus position detected by the image capturing focusing means is erroneous, and thereby to keep the focusing accuracy by narrowing the scanning range of the image capturing lens, for example. On the other hand, in the case of the high evaluation value, there is no need to narrow the scanning range of the image capturing lens, because the detecting accuracy of the image capturing focusing means is considered high. Incidentally, the evaluation value for the sharpness of the subject image means something like AF evaluation value described later, for example, to which, however, the invention is not limited.

However, in the case that the evaluation value is not more than the prescribed value, it is preferable to determine the focus position of the image capturing lens based on the results of measurement by the range finding means only, because the reliability of the focus position detected by the image capturing element is considered to be considerably low.

An electronic still camera of the seventh embodiment is provided with the range finding means that measures the distance to the subject by receiving the detection wave, and the image capturing focusing means which can detect the focus position of the image capturing lens, by scanning the image capturing lens in the limits fixed by the measuring results of the range finding means, based on the output signal of the image capturing element where the image of subject is formed through the image capturing lens, and the scanning range of the image capturing lens is expanded, when the amount of the detecting wave is not more than the prescribed value. The active range finding device, for example, obtains the distance to the subject by radiating the infrared rays or ultrasonic waves to a subject and thereby by receiving the reflected detection waves. However, depending on the photographing environment, the amount of the reflected detection waves is feared to be made relatively small by the influence of the other infrared rays or ultrasonic waves. In this case, the range finding result of the range finding means becomes inappropriate, resulting in the inappropriate scanning range of the image capturing lens, which causes a possibility of acquisition of the erroneous focus position. In such a case, it is possible to obtain an appropriate focus position by the image capturing focusing means, by expanding the scanning range of the image capturing lens. Incidentally, it is conceivable that the detecting waves are infrared rays or ultrasonic waves, to which, however, the invention is not limited. Besides, the prescribed value that is compared with an amount of the detection wave is always inconstant, and it may change according to the value of the infrared rays in the environment.

An electronic still camera of the eighth embodiment is provided with the range finding means that measures the distance to the subject, the image capturing focusing means which can detect the focus position of the image capturing lens, by scanning the image capturing lens in the limits fixed by the measuring results of the range finding means, based on the output signal of the image capturing element where the image of subject is formed through the image capturing lens, the photometric means to measure the luminance of the subject, and with the electronic flash means which radiates the electronic flash light when the shutter is released, and the electronic flash means fixes the amount of the radiation light, in accordance with the subject distance based on the result of the measurement by the range finding means, or the subject distance based on the focus position detected by the image capturing focusing means, whichever is shorter. Therefore, though the subject distance which is used for the determination of the amount of the light radiated is erroneous, the error is surely to the shorter distance side accordingly, and the amount of the electronic flash light becomes small, thus, the overexposure is controlled.

DETAILED DESCRIPTION OF THE PREFERRED EMBODIMENT

Figure 1:
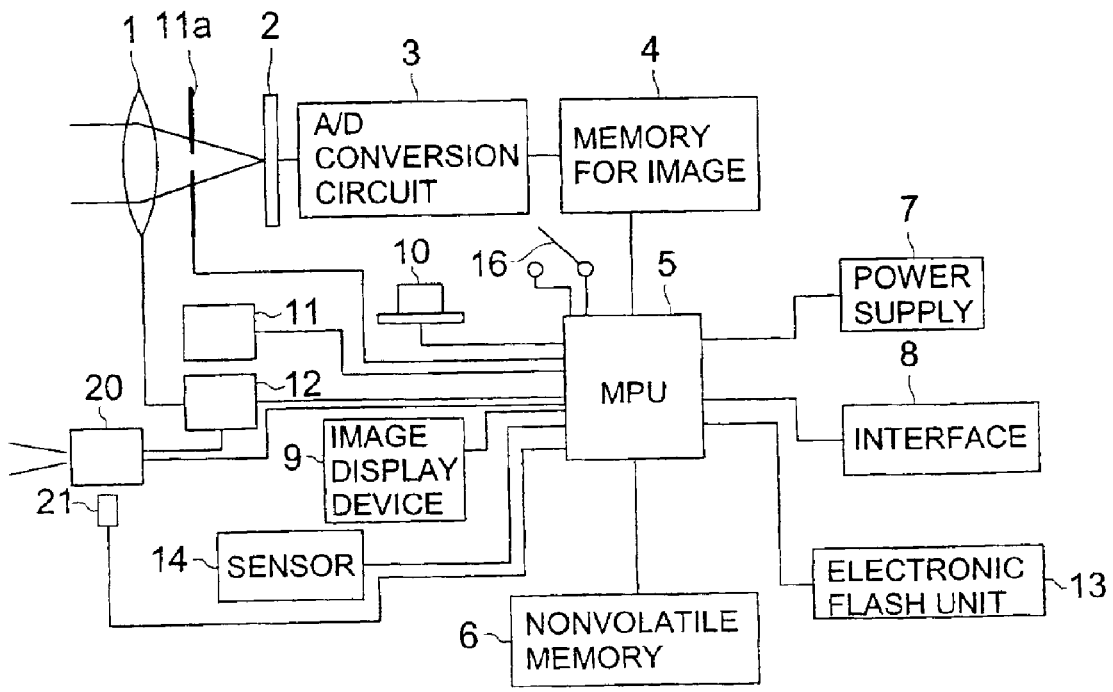
FIG. 1 is a block diagram showing the construction of an electronic still camera relating to the present embodiment.

Referring now to the drawings, we explain an embodiment of the present invention as follows. FIG. 1 is a block diagram showing the construction of the digital electronic still camera relating to the present embodiment. In FIG. 1, CCD 2 representing the image capturing element on which the optical image is formed on its light receiving plane through image capturing lens 1 representing a zoom lens, and a diaphragm 11a is one for outputting an analog signal corresponding to the optical image and for conducting the so-called photoelectric conversion, while, A/D converter 3 is one for converting the analog signal which is inputted from CCD 2 into the digital signal to output it. Incidentally, let it be assumed that, the higher the intensity of the incident light to CCD 2 is, the greater the value of the digital signal obtained through conversion from the analog signal is, in the A/D conversion circuit 3 in the present embodiment. Image data obtained through the A/D conversion circuit 3 are stored momentarily in picture image memory 4.

The image data stored in the picture image memory 4 is subjected to some kinds of image processing by MPU 5 representing a control means, and finally, it is stored in nonvolatile memory 6 such as a memory card, connected to MPU 5. Incidentally, MPU 5 is arranged so that it receives power from power supply unit 7, such as a built-in buttery, and conducts communication with the outside by using IrDA (infrared Data Association) or serial communication through interface device 8. Moreover, MPU 5 starts operating when power switch 16 is turned on, and receives a release signal from release button 10, to drive an unillustrated shutter device for performing photographing. Still more, MPU 5 controls the image display device 9 such as a liquid crystal monitor to make the image display device 9 to display the image. Furthermore, MPU 5 starts charging electronic flash device 13 from power supply 7, and controls the timing of flashing. The electronic flash device 13 performs the flashing operation when the electronic flash radiation mode is set.

Still more, MPU 5 is connected to sensor 14 which can detect an object that is close to optical finder 15 (FIG. 2), and also connected to photometric device 21, to receive the detection signals from them.

Further, the electronic still camera shown in FIG. 1 is provided with active range finding device 20. This range finding device 20 has the functions to radiate infrared rays representing the detection waves, then to detect the infrared rays reflected on the subject, and to measure the distance to the subject based on the time difference between them. However, it is also possible to use the range finding device which conducts range finding by using, for example, ultrasonic waves.

Furthermore, the electronic still camera in this embodiment is provided with the image capturing focusing device, and this performs focusing operations by making use of the functions of CCD 2 and MPU 5. According to the image capturing focusing device (2, 5) representing an image capturing focusing means, the position where the image becomes sharpest is detected as the focus position by converting into the image data in CCD 2 gradually, while moving (scanning) the image capturing lens 1, and by processing this picture image in MPU 5. Contents of the concrete processing will be described later. Herein, an operation to obtain the focus position by moving the image capturing lens 1 is called "position searching".

MPU 5 outputs to motor 12 the driving signal which is corresponding to the focus position obtained by the position searching. Following the driving signal, motor 12 completes the focusing action by moving the image capturing lens 1 to the obtained focus position.

Figure 2:
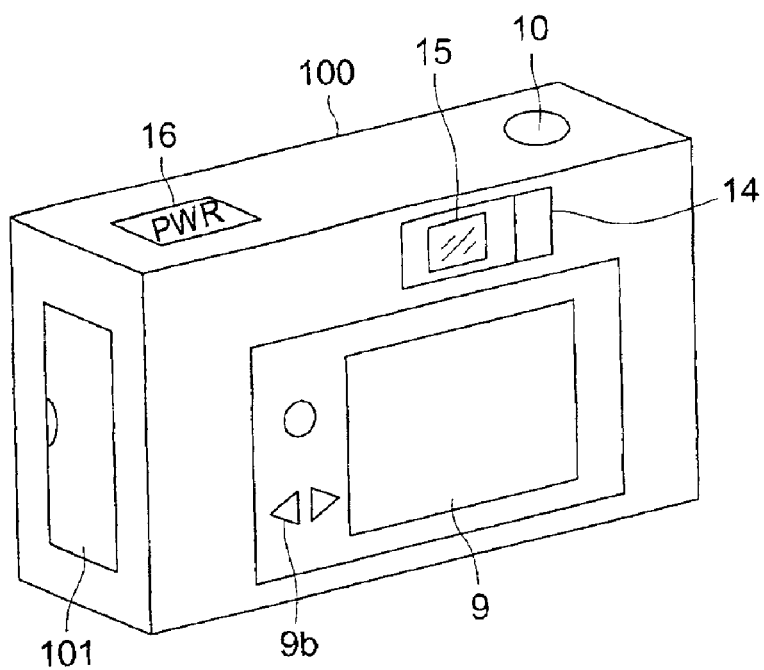
FIG. 2 is a perspective view of the electronic still camera relating to the present embodiment.

FIG. 2 is a perspective view of the electronic still camera in the present embodiment. The electronic still camera 100 is provided on its top with shutter release button 10 and main switch 16, and liquid crystal monitor 9 representing an image display device is arranged on the rear side. Monitor display button 9a and frame feed button 9b are arranged on the side of the liquid crystal monitor 9. The shutter release button 10 is arranged so that it can output different signals to MPU 5 depending on two-step pressing operations of half-pressing and full-pressing.

There is provided optical finder 15 above the liquid crystal monitor 9, and sensor 14 is arranged to be adjacent to the optical finder 15. Lid 101 for a battery case is arranged on the left side of the electronic still camera 100, and a battery can be replaced by opening this lid 101.

In the present embodiment, in order to shorten the driving time of focusing while securing the focusing accuracy, the focusing is performed by interlocking the range finding device 20 with the image capturing focusing device (2, 5). To be more concrete, the range finding device 20 is operated to obtain the distance to the subject, then the measured distance is compared with a table which is stored in MPU 5 to obtain the focus position of image capturing lens 1, and then, the image capturing lens 1 is scanned through driving of motor 12 by the image capturing focusing device (2, 5) in the limited range lying across the focus position mentioned above so that the optimum focus position is obtained.

However, this focusing operation sometimes fails to obtain the correct focus position.

Figure 3:
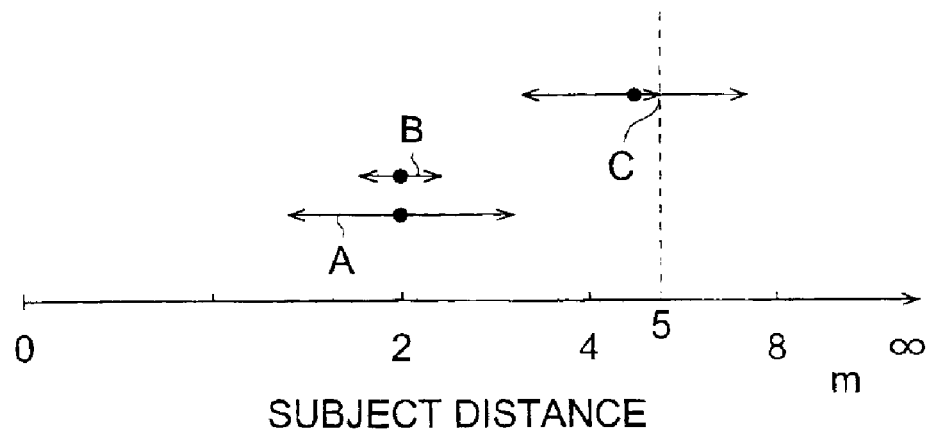
FIG. 3 is a diagram showing the relationship between the subject distance and the scanning range of the image capturing lens.

FIG. 3 shows the relation between the subject distance and the scanning range of the image capturing lens. When the subject distance is usually measured to be 2 m by the range finding device 20, it is possible to obtain the optimum focus position by scanning the image capturing lens 1 within the range (A) corresponding to front and rear 1 m of the measured distance.

However, it is conceivable that the detection accuracy of the image capturing focusing device (2, 5) is low, when the luminance of the subject is low, as stated above. When the luminance of the subject is judged to be low on the basis of a photometric value by photometric device 11, MPU 5 narrows the scanning range of the image capturing lens 1, for example, to 0.5 m before and behind the subject distance of 2 m (like B). Due to this, it is possible to control that the focus position detected by the image capturing focusing device (2, 5) is greatly far from the distance 2 m measured by the range finding device 20, even if it is erroneous, thus, focusing accuracy can be secured to a certain extent.

When the luminance of the subject which was measured by the photometric device 11 is below the limit value and the detecting accuracy of the image capturing focusing device (2, 5) is hardly reliable accordingly, if the focus position of the image capturing lens 1 is determined on the basis of the results of the measurement by the range finding device 20, without operating the image capturing focusing device (2, 5), there is no room for participation of the detection of the image capturing focusing device (2, 5) whose detection accuracy is not reliable to contribute in the determination of the focus position, and thereby, the accuracy of the focusing can be secured.

Furthermore, there is a case wherein the subject exists beyond the range (for example 5 m) covered by the electronic flash light from the electronic flash device 13 in the night or indoor photographing. When MPU 5 judges that the electronic flash radiation mode is selected in the aforesaid case, the far side of the scanning range of the image capturing lens 1 is limited to the position (C) corresponding to the subject distance 5 m, and focusing on the main subject existing beyond the electronic flash light covering range is avoided.

Thus, it is possible to obtain the image which is less blurred as a whole by focusing on a subject existing in the effective electronic flash light covering range more realistically.

Furthermore, in the present embodiment, in order to overcome the problem that the detection operation of the image capturing focusing device (2, 5) takes time, the image monitoring area which is smaller than image plane for photographing is set at the center of the image plane for photographing, for example, where the main subject is supposed to exist, and the focus position is obtained based on the image signal from CCD 2 corresponding to this image monitoring area. However, there is a fear for the erroneous focus position, resulted from the failure to catch an image of the subject because of setting of the image monitoring area.

To explain more concretely, since the electronic still camera 100 of the present embodiment is provided with the optical finder 15, when a photographer photographs while viewing through the optical finder, the difference between the position of the image capturing lens 1 and that of the optical finder 15 causes the parallax originally.

Figure 4:
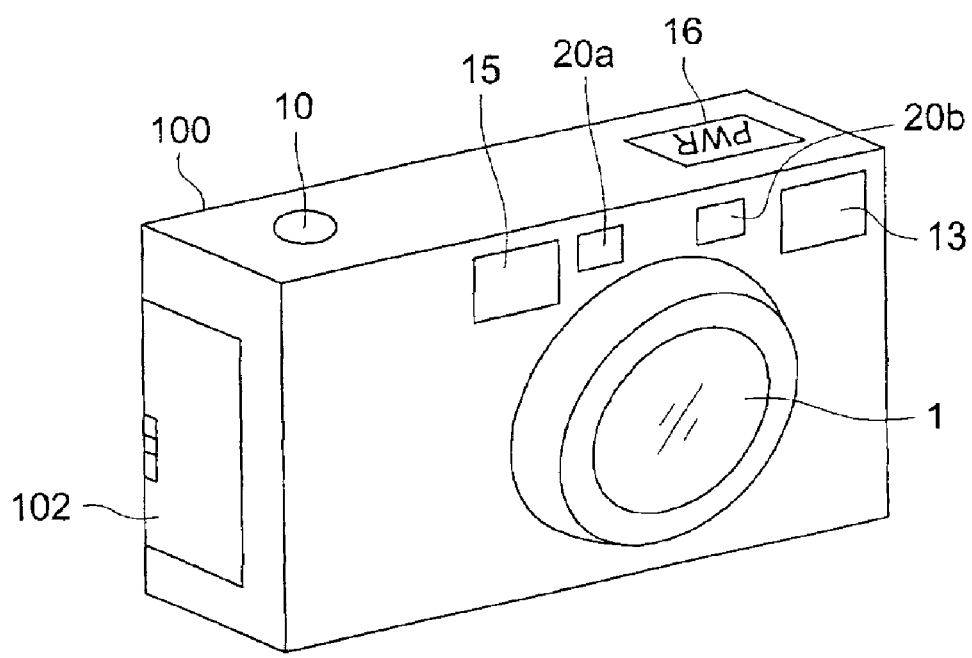
FIG. 4 is a perspective view that is viewed from the front side of electronic still camera 100 of the present embodiment.

FIG. 4 is a perspective view that is viewed from the front side of the electronic still camera 100 in the present embodiment. In FIG. 4, infrared radiating window 20a and infrared receiving window 20b of the range finding device 20 (FIG. 1) are arranged above the image capturing lens 1. An objective lens of the optical finder 15 is arranged on the left side of the infrared radiating window 20a, and a radiating window of electronic flash unit 13 is arranged on the right side of the infrared receiving window 20b.

Figure 5:
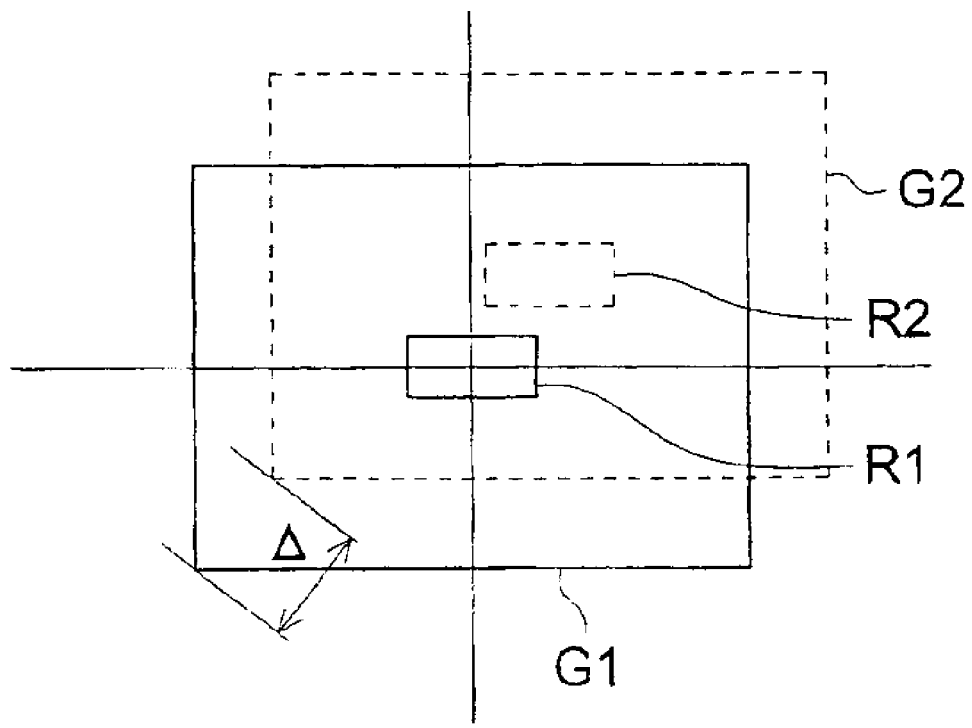
FIG. 5 is a diagram showing the positional arrangement of the image plane for photographing and the image monitoring area.

FIG. 5 is a diagram showing the arrangement of the image plane for photographing and the image monitoring area. When the near subject is aimed through the optical finder 15, the image plane for photographing (G1), or the subject scope imaged on the light receiving plane of the image capturing element, can be greatly different from the subject scope (G2) observed through the optical finder 15 because of the influence of the parallax, though there is not big difference for the distant subject. In this case, a photographer thinks that this main subject is focused, because the photographer views the main subject at the center of the visual field frame 10 of the optical finder 15. However, the right-upper potion of the main subject is focused, and there is a fear that an erroneous focus position is obtained.

On the other hand, this amount of parallax (amount of deviation $\Delta$) is changeable depending on the subject distance and the focal length (zooming ratio) of the lens. To be more concrete, the longer the subject distance is, the smaller the deviation $\Delta$ is, and the shorter the subject distance is, the larger the deviation $\Delta$ is. Further, the shorter the focal length is, the smaller the deviation $\Delta$ is, but the longer the focal length is, the larger the deviation $\Delta$ is.

Therefore, in the present embodiment, if MPU 5 calculates the amount of the parallax on the basis of the range finding result of the range finding means 20 and the focal length at that moment, and if the image monitoring area R1 is displaced against the image plane for photographing G1 by the amount corresponding to deviation $\Delta$ in the direction toward the upper-right side in FIG. 5 so that the subject at the center of the visual field frame of the optical finder 15 may be included in the image monitoring area R1, it is possible to focus on the main subject desired to be photographed, irrespective of the subject distance.

Namely, the position of the image monitoring area R1 for the image plane for photographing G1 can be changed based on the subject distance measured by the range finding device 20, the direction in which the optical finder is set for the image plane for photographing G1 (on upper-left, when viewed from the front of the camera), and on the distance between the optical axis of image capturing lens 1 and that of the optical finder system 15. Incidentally, though deviation value $\Delta$ may be made to agree with the amount of the parallax, it is preferable to make the deviation $\Delta$ smaller than the amount of the parallax, because a photographer knows the parallax from its experience and may aim the subject, considering it when photographing.

However, a photographer does not always view through the optical finder in photographing. The embodiment of the electronic still camera 100 can display the subject image directly on the image display device 9 based on the image signal from CCD 2, irrespective of the operation of the shutter release button, and the photographer can photograph, while watching the displayed image.

Therefore, if the position of the image monitoring area R1 for the image plane for photographing G1 can be changed, when MPU 5 judges in accordance with the detection result of the sensor 14 of the electronic still camera 100 that a photographer is viewing through the optical finder 15, the inappropriate focusing based on the parallax can be prevented.

Conversely, when the image display device 9 that displays an image of a subject is displaying the subject image based on the output signal from the CCD 2, it is conceivable that a photographer is photographing while watching the displayed image. Therefore, if the position of the image monitoring area R1 is not changed, independently of the results of measurement by the range finding device 20, it is conceivable that the photographer can focus on the subject which is desired by the photographer to be focused on.

Furthermore, since the image capturing lens 1 is a zoom lens, it is also conceivable to change the area of the image monitoring area R1 for the image plane for photographing G1 on the basis of its zoom position and the subject distance measured by the range finding device 20. For example, when the image magnification is small and a percentage of the subject image is small on the image plane for photographing, it is not preferable to expand the image monitoring area R1, because a background is focused. In this case, therefore, when the image magnification is judged to be small on the basis of the obtained zoom position and the subject distance, MPU 5 narrows the area of the image monitoring area R1 for the image plane for photographing G1, which makes it possible to perform the more appropriate focusing action, because the appropriate image monitoring area R1 can be set for the size of the subject image for the image plane for photographing G1.

Still more, since the image capturing lens 1 is a zoom lens, it is conceivable to change the scanning range of the image capturing lens 1 in the image capturing focusing device (2, 5) on the basis of its zoom position and the subject distance measured by the range finding device 20. That is, when the main subject is distant, (for example, 10 m or more), its distance may not be measured appropriately, because the infrared rays radiated from the range finding device 20 do not reflect effectively on the main subject. When the image magnification is judged to be small on the basis of the obtained zoom position and the subject distance, MPU 5 drives the image capturing focusing unit (2, 5) only, without relying on the results of range finding by the range finding device 20, which makes it possible to obtain the focus position appropriately.

Still more, when a photographer photographs a single-colored wall, for example, the image signal from CCD 2 is uniform, and there is a characteristic problem that the image capturing element type range finding unit (2, 5) can not perform the focusing action properly based on the uniform image signal. Therefore, according to the present embodiment, AF evaluation value corresponding to the sharpness of the subject image received by CCD 2 is obtained, and this AF evaluation value is used to judge whether the focusing accuracy of the image capturing focusing unit (2, 5) is reliable or not.

The calculation of the AF evaluation value is performed by operating the frequency analysis of the image data from CCD 2. In the frequency analysis, AF evaluation value is the integrated value of the intensity of the signal that passed through a band-pass filter (BPF) which is made with software. That is, the operation which calculates the intensity of a specific frequency included in the image is performed. FFT (Fast Fourier Transform) is used for the practical operation. FFT is operated on the image data in the FFT operation area in the image monitoring area. In FFT, the digital signal of the image data is transformed to the signal of the frequency domain, and only a high frequency in the certain band is taken out to integrate its intensity, and the total value of each FFT operation area is obtained to be data of AF evaluation value.

When this AF evaluation value is not more than the prescribed threshold value, the scanning range of the image capturing lens 1 is narrowed based on the judgment of the low reliability of the focus position detected by CCD 2, whereby the focusing accuracy can be secured by controlling the large deviation from the focus position based on the distance measured by the more reliable range finding device 20, even if the focus position detected by the image capturing focusing device (2, 5) is erroneous. On the other hand, when AF evaluation value is high, it can be said that there is no need to narrow the scanning range of the image capturing lens 1, because it is conceivable that the detection accuracy of the image capturing focusing device (2, 5) is high.

Furthermore, when the AF evaluation value is not more than the lower limit value, it is conceivable that the reliability of the focus position detected by CCD 2 is considerably low. Therefore, it is preferable to determine the focus position of the image capturing lens 1 only on the basis of the results of the measurement by the range finding device 20.

Since the range finding device 20 of the electronic still camera 100 of the present embodiment is the so-called active range finding device, it obtains the distance to a subject by radiating the infrared rays (or ultrasonic waves) to the subject and by receiving the reflected infrared rays. However, according to the photographing environment, there is a fear that a mount of the reflected infrared rays is influenced by other infrared rays or ultrasonic waves to become relatively small. In such a case, the range finding result of the range finding device 20 becomes inappropriate, resulting in an appropriate scanning range of the image capturing lens 1, and a wrong focus position is feared to be obtained. Therefore, in the present embodiment, when extraordinary infrared rays are detected though the infrared rays are not radiated from the range finding unit 20, or when the range finding value obtained by the range finding device 20 deviates greatly from the detecting result of the image capturing focusing device (2, 5) and the detecting result of the image capturing focusing device (2, 5) is reliable to a certain extent, it is possible to obtain the focus position which is more appropriate by expanding the scanning range of the image capturing lens 1.

Furthermore, according to the characteristics of the CCD, when the exposure is excessive, the pixels which perform the photoelectric conversion are saturated, and they output the constant valued image signals only, which makes it difficult to form images. Therefore, it is necessary to prevent overexposure in the electronic still camera. It is relatively easy to prevent overexposure for the photographing in the natural light, but it is difficult to judge gradation of subjects before taking a picture in stroboscopic photographing.

Therefore, in the present embodiment, the electronic flash device 13 representing an electronic flash means determines an amount of radiation light in accordance with the subject distance based on the result of measurement by the range finding device 20 or the subject distance based on the focus position detected by the image capturing focusing device (2, 5), whichever is shorter. Therefore, even if there is an error in the subject distance which is used for determining of the amount of radiation light, the error is always on the shorter side, thus, the amount of radiation light for electronic flash is small, and overexposure can be controlled.

The invention has been explained above, referring to the embodiments, to which, however, the invention is not limited, and modification and improvement may naturally be made according to circumstances.

The digital still camera of this invention makes it possible to provide an electronic still camera that can measure the distance at high accuracy and can control the overexposure.

What is claimed is:

1. An electronic still camera, comprising:

a lens to form an image of a subject;

a distant measuring section to measure a distance to a subject and to output a distance signal;

an image capturing focusing section having a driving section to shift the lens within a scanning range determined based on the distance signal, an image capturing element to output an image signal of the image of the subject and a detecting section to detect a focusing point of the lens based on the image signal; and a light measuring section to measure a luminance of the subject and to output a luminance signal;

wherein the image capturing focusing section changes the scanning range of the lens in accordance with the luminance signal measured by the light measuring section.

2. The electronic still camera of claim 1, wherein when the luminance of the subject represented by the luminance signal is lower than a predetermined luminance level, the image capturing focusing section determines the focusing point of the lens based on the distance signal without detecting the focusing point of the lens based on the image signal.

3. An electronic still camera, comprising:

a lens to form an image of a subject;

a distant measuring section to output a distance signal corresponding to a distance to the subject by receiving a detection beam from the subject; and an image capturing focusing section having a driving section to shift the lens within a scanning range determined based on the distance signal, an image capturing element having an image capturing area to receive the image from the lens and outputting an image signal of the image and a detecting section to detect a focusing point;

wherein the image capturing focusing section expands the scanning range when an amount of the detection beam is lower than a predetermined value.

* * * * *